United States Patent [19]

Ayres et al.

[11] 3,931,010

[45] Jan. 6, 1976

[54] SERUM/PLASMA SEPARATORS WITH CENTRIFUGAL VALVES

[75] Inventors: Waldemar A. Ayres, Rutherford; William J. Holderith, Wyckoff, both of N.J.

[73] Assignee: Becton, Dickinson and Company, East Rutherford, N.J.

[22] Filed: Feb. 27, 1974

[21] Appl. No.: 446,353

[52] U.S. Cl. ................ 210/109; 210/359; 210/516; 210/DIG. 23

[51] Int. Cl.[2] ........................................ B01D 21/26

[58] Field of Search ....... 23/230 B, 258.5, 259, 292; 128/214 R, 272, 214 M; 210/83, 84, 109, 210/131, 131, 359, 514–518, DIG. 23, DIG. 24; 233/1A, 1 R, 26

[56] References Cited

UNITED STATES PATENTS

| | | | |
|---|---|---|---|
| 2,577,780 | 12/1951 | Lockhart | 128/272 X |
| 3,661,265 | 5/1972 | Greenspan | 210/359 |
| 3,779,383 | 12/1973 | Ayres | 210/109 X |
| 3,786,985 | 1/1974 | Blaivas | 233/26 |
| 3,814,248 | 6/1974 | Lawhead | 210/83 |

FOREIGN PATENTS OR APPLICATIONS

| | | | |
|---|---|---|---|
| 1,504,514 | 12/1967 | France | 128/272 |

*Primary Examiner*—Charles N. Hart
*Assistant Examiner*—Robert H. Spitzer
*Attorney, Agent, or Firm*—Kane, Dalsimer, Kane, Sullivan and Kurucz

[57] ABSTRACT

A self-contained fluid separator assembly is disclosed capable of separating blood into its component parts of plasma or serum, the light phase, and the cellular portion, the heavy phase. The assembly comprises a container having at least one open end for receiving blood for subsequent separation and a closure sealing the open end of the container. The closure is formed of a self-sealing elastomeric material which is penetrable by a pointed hollow needle through which the blood to be separated is conducted into the container. A piston is slidably disposed in the container with its outer surfaces in sealing contact with the inner surfaces of the container. Centrifugally actuated valve means is provided on the piston which is normally closed and automatically opens in response to centrifugal force. When blood in the container is subjected to centrifugal force it first separates into its light phase and heavy phase. Thereafter the piston with open valve moves down through the light phase while retaining sealing engagement with the inner surfaces of the container. Positive stop means is provided on the container between its ends so that the piston as it moves through the light phase will contact the stop means and stop at a predetermined distance above the bottom of the tube. Then the valve means automatically closes to provide an impervious barrier between the separated light and heavy phases of the blood.

5 Claims, 4 Drawing Figures

SERUM/PLASMA SEPARATORS WITH CENTRIFUGAL VALVES

BACKGROUND OF THE INVENTION

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940 and 3,696,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a distortable piston made of a resilient material or valve means associated with the piston to affect a sealed separation after centrifugation.

The present invention relates to separators and more particularly to a device for separating blood plasma from cellular material of the type disclosed in commonly assigned application Ser. No. 247,483, filed Apr. 25, 1972.

SUMMARY OF THE INVENTION

The invention generally contemplates the provision of an improved self-contained sealed fluid separator assembly capable of separating blood into its component parts of plasma or serum as the light phase and the cellular portion as the heavy phase and establishing a sealed barrier therebetween without the necessity of opening the container or decanting the separated light phase from the heavy phase.

It is an object of the invention to automatically separate blood into its component phases by simply subjecting the self-contained assembly to centrifugal force so that upon completion of the centrifuging operation an impervious barrier separates the light phase from the heavy phase of the blood. The assembly is capable of withstanding rough handling through the mails, inversion of the container without remixing the component phases and preventing various chemical constituents in the light phase from leaking into and mixing with the heavy phase or vice versa. Another object of the invention is to pass the light phase of the blood through a filter associated with a centrifugally actuated valve means. It is a further object of the invention to provide a self-contained assembly for separating blood into its component parts which is inexpensive to manufacture, simple to assemble and easy to use.

The separator assembly for separating blood into its component parts of plasma or serum, the light phase, and cellular portion, the heavy phase, is a self-contained unit which requires only that a sample of blood to be separated be provided within the container. The container is formed having at least one open end which is adapted to receive blood for separation into its component phases. A closure is mounted in the open end for sealing the container, this closure being formed of a self-sealing elastomeric material which is penetrable by a pointed hollow needle through which blood to be separated is conducted into the container. A piston is slidably mounted in the container having its outer cylindrical surfaces in sealing engagement with the inner surfaces of the container. Centrifugally actuated valve means is disposed on said piston and is normally closed. The valve means automatically opens in response to increased centrifugation so that when the container is subjected first to moderate centrifugal force, the blood separates into its light phase and heavy phase; and when the centrifugal force is substantially increased thereafter the valve means automatically opens with the light phase passing up through the valve means while the piston moves down through the light phase retaining its sealing engagement with the inner surfaces of the container. A stop means is formed on the container and disposed a predetermined distance from the bottom of the container which is remote from the piston in its initial position. The piston after moving through a major part of the light phase is caused to stop when it reaches the stop means. When centrifugation ceases the valve means automatically shifts from the open position to the closed position to provide an impervious barrier between the separated light phase and heavy phase of the blood. Thereafter, the separated sample is ready for testing.

BRIEF DESCRIPTION OF THE DRAWINGS

For a better understanding of the invention reference is had to the drawings which illustrate the preferred embodiments of the invention herein.

DESCRIPTION OF THE PREFERRED EMBODIMENT

Figure 1:
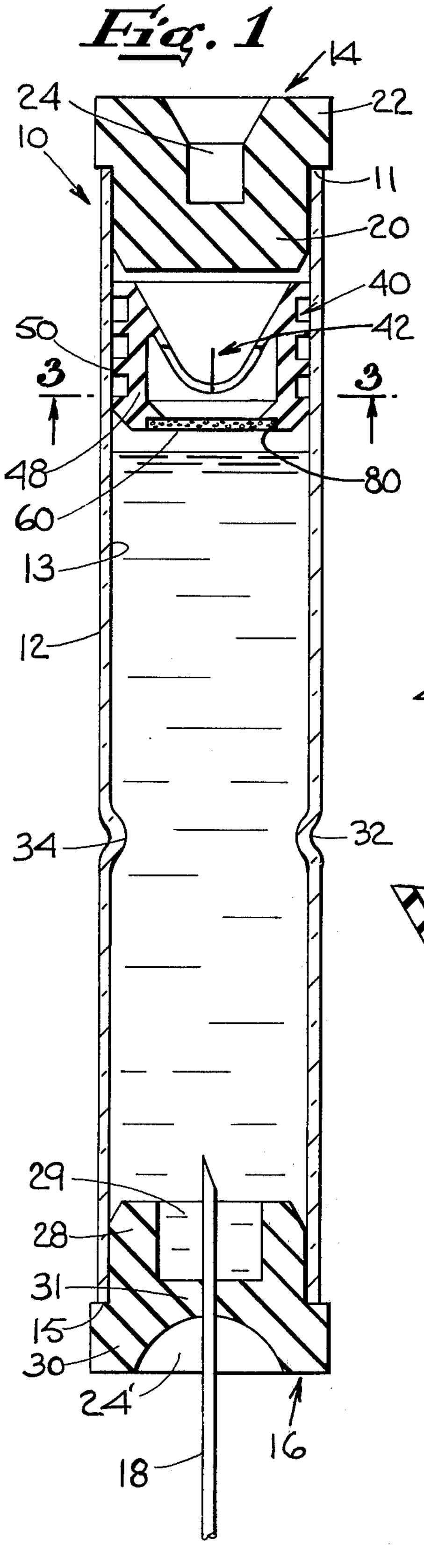
FIG. 1 is a sectional elevational view of the separator assembly illustrating a pointed cannula penetrating one of the closures through which blood is introduced into the container prior to separation.
Figure 3:
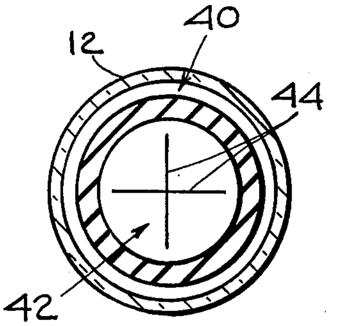
FIG. 3 is a sectional view taken along the line 3—3 of FIG. 1.
Figure 4:
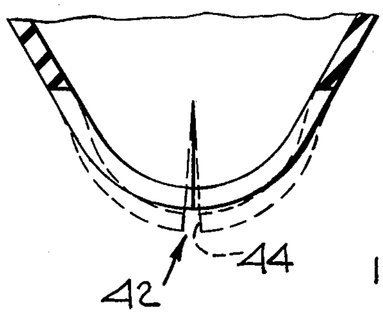
FIG. 4 is an enlarged fragmentary view showing the centrifugally actuated valve with its open position depicted in phantom.

In FIG. 1, the separator assembly 10 comprises a tubular member of container 12 having mounted in each of the open ends 11 and 15 closures 14 and 16. Closures 14 and 16 are made of a self-sealing elastomeric material such as rubber. Closure 16 is capable of being penetrated by cannula 18 for conducting blood into the container. When the cannula is removed, the closure reseals with no loss of blood.

Closure 14 is formed with a depending cylindrical body portion 20 and an integral flanged head portion 22. Body portion 20 has a diameter slightly greater than the internal diameter of the container 12 so that closure 14 when mounted into end 11 provides an interference fit to seal this end. Head portion 22 may be shaped in the form of a hexagon and is slightly greater in diameter than body portion 20 which permits the assembly to be positioned on its side without danger of rolling. Body portion 20 has an annular recess 24 to provide a relatively thin zone which is more readily penetrable by a cannula, when desired.

Stopper 16 has a cylindrical body portion 28 and an integrally formed cylindrical head portion 30 having an axial recess 24'. Body portion 28 has an annular recess 29 to provide a self-sealing penetrable zone 31 to facilitate insertion of cannula or pointed hollow needle 18 with minimum force while maintaining a sealed closure. As noted above, stopper or closure 14 as well as 16 is inserted into ends 11 and 15 in compression to maintain ends 11 and 15 of container 12 in sealed gas tight engagement.

Tubular member of container 12 is formed preferably of glass but any other suitable material may be employed. Intermediate ends 11 and 15 of tubular member 12 is an annular groove 32 forming a constriction and a stop means 34 as a part of the inner surfaces of container 12. Thus, as piston 40 moves from the initial starting position illustrated in FIG. 1 to the terminal position after the separation of the light phase from the heavy phase, the piston comes to rest at the stop means 34. The piston may be formed of elastomeric material and has greater specific gravity than blood so that it will move through the light phase when the increased centrifugal force is applied to the assembly and eventually will automatically come to rest at stop means 34. The seal of the piston with respect to the inner surfaces of the container is maintained throughout its travel from its initial position of FIG. 1 to its terminal position of FIG. 2.

The piston 40 comprises an outer wall 48 and formed integrally with wall 48 are a plurality of axially spaced resilient sealing rings 50 which contact the inner wall surface 13 of container 12 in sealing engagement. Piston 40 when mounted in container 12 will maintain sealing contact with inner wall 13 of container 12 throughout its path of travel within container 12.

During higher speed centrifuging when increased forces are generated piston 40 will start to move downwardly. At the same time, and in most instances before, because of the greater specific gravity of the valve means 42, slits 44 will automatically open and will enable the separated light phase liquid to pass upwardly through the opened apertures and enable piston 40 to move from its initial position of FIG. 1 to its final position of FIG. 2 while maintaining sealing engagement with the inner wall 13 of container 12. After piston 40 stops its movement in container 12 and comes to rest on stop means 34, centrifugal force is terminated and valve means 42 automatically closes.

Figure 2:
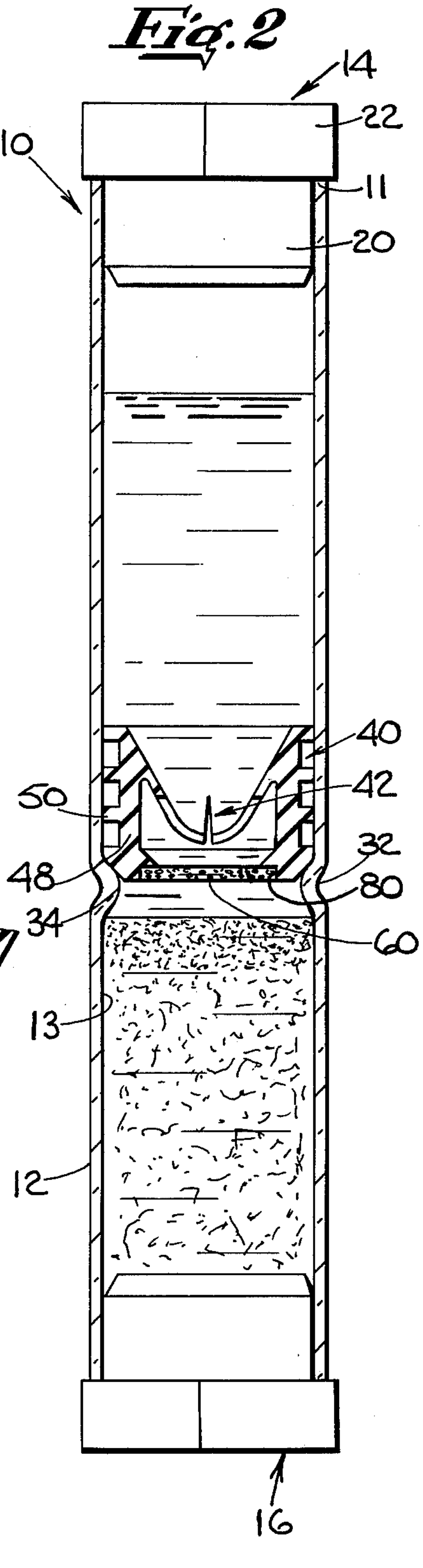
FIG. 2 is a view similar to FIG. 1 illustrating the separation of the blood into the light phase and heavy phase with the piston engaging the stop means.

As illustrated in FIG. 2 piston 40 has completed its travel within container 12 and is stopped from further movement in container 12 by stop means 34 but valve means 42 remain open as long as high speed centrifugation continues. Upon termination of centrifugation valve means 42 close. Also, a portion of the light phase remains above the separated heavy phase and is not utilized as part of the separated light phase.

Filter element 60 is mounted in annular recess 80 of piston 40 and may be made of any suitable filter material chemically inert to blood and capable of filtering serum or plasma. Such a material may be asbestos or glass wool, a plastic foam having interconnecting passages, waterproof paper or other suitable fibrous or particulate material. The main purpose for employing filter 60 is to remove any fibrin or partially formed fibrin material from passing through valve means 42.

When operating the separator assembly of the invention herein it is preferred that the assembly be evacuated so that when cannula 18 penetrates closure 16 blood will fill container 12. It is also contemplated to provide a separator assembly disclosed in U.S. Pat. Nos. 2,460,641; 3,469,572 and 3,494,352. It is important when filling the assembly 10 that blood be introduced into container 12 through the stopper 16 mounted on the bottom of the container to obviate the possibility of having blood ceels trapped between the piston 40 and stopper 22 which will later separate to form the chamber where the light phase will be collected and which would contaminate the light phase with whole blood. If the assembly is evacuated it is obvious blood will fill the space between closure 16 and the piston 40.

After cannula 18 is withdrawn and container 12 is filled with blood the assembly is placed in a centrifuge and the blood is separated initially employing moderate centrifugal forces which do not cause the piston 40 to move from its initial position. This precipitates or separates the blood cells or blood clot into the tube portion below constriction stop means 34. Thereafter the rotational speed of the centrifuge is increased which causes a substantial downward thrust on the piston. Before the time piston 40 starts to move valve means 42 automatically opens and the piston moves downwardly through the light phase with the light phase passing up through the valve means. Piston 40 maintains sliding and sealing engagement with the inner wall 13 of container 12. The piston completes its movement when it engages stop means 34 and then centrifuging is terminated. The valve means 42 will close to thereby establish an impervious barrier between the light and heavy phases of the blood.

The separated blood sample is ready for use. As desired, the serum or plasma can be taken from one end and/or the concentrated red cells can be taken from the other end.

While variations of the invention herein may be had, the objectives of the invention have been illustrated and described.

What is claimed:

1. A self-contained fluid separator assembly, capable of separating blood into its component parts of plasma or serum and cellular portion, comprising:

a. a container having at least one open end which is adapted to receive blood for subsequent separation into a light phase ans a heavy phase;

b. a closure sealing the open end of the container, the closure being formed of a self-sealing elastomeric material which is penetrable by a cannula through which blood to be separated is conducted into the container;

c. a piston having a specific gravity relatively greater than the cellular portion of the blood and slidably mounted in the upper portion of the container and having means on an outer surface in sealing engagement with an inner surface of the container;

d. centrifugally actuated valve means associated with said piston, said valve means being in the form of a downwardly projecting substantially dome-shaped concave diaphragm having a specific gravity greater than blood and having a slit therein openable when subjected to substantial centrifugal force, said valve means being normally closed, so that when said container is subjected to moderate centrifugal force the blood separates into its light phase and heavy phase with the piston staying in the upper portion of the container, and subsequently when increased centrifugal force is used on the valve means automatically opens with the light phase passing up through the valve means enabling the piston to move down through the light phase while retaining sealing engagement with the inner surfaces of the container, said valve means remaining open until termination of the substantial centrifugal force; and mechanical stop means on the container whereby the piston when moving through the light phase will stop a predetermined distance from one of the ends of the container followed by termination of substantial centrifugal force which permits the vlave means to automatically shift from an open position to a closed position to provide an impervious barrier between the separated light phase and heavy phase of the blood.

2. A self-contained fluid separator of claim 1, wherein the stop means on the container is an annular groove interposed between the ends of the container forming an annular constriction of the inner surface of the container so that said piston is prevented from passing the stop means when subjected to centrifugal forces.

3. The invention in accordance with claim 1, wherein a plurality of spaced annular sealing rings are on the periphery of the piston and in sealing engagement with the interior of the container.

4. The invention in accordance with claim 1, wherein the valve means is independent of the piston sealing means.

5. The piston of claim 1, wherein the body portion of said piston is formed having a filter means associated therewith and in fluid communication with said valve means whereby said filter means is adapted to remove particulate material from the light phase as the piston moves downwardly therethrough.

* * * * *